April 15, 1969     J. P. MANGIN     3,439,288
GAS LASER DEVICE FOR PRODUCING RADIATION IN THE 40-MICRON BAND Filed March 18, 1964

INVENTOR:
J.P. MANGIN

BY Paul M. Craig, Jr.
ATTORNEY

United States Patent Office 3,439,288
Patented Apr. 15, 1969

3,439,288
GAS LASER DEVICE FOR PRODUCING RADIATION IN THE 40-MICRON BAND
Jean Paul Mangin, Paris, France, assignor to CSF—Compagnie Generale de Telegraphie Sans Fil, Paris, France
Filed Mar. 18, 1964, Ser. No. 352,875
Claims priority, application France, Mar. 27, 1963, 929,390
Int. Cl. H01s 3/22
U.S. Cl. 331—94.5          17 Claims

ABSTRACT OF THE DISCLOSURE

A laser operating with hydrogen and producing infrared radiation in the 40-micron band, comprising an enclosure with mirrors forming a Perot-Fabry resonator, provided with an external circuit interconnecting the extremities thereof. The external circuit comprises means of liquefying hydrogen, further catalyzing means favoring the transformation from orthohydrogen into parahydrogen, and finally reheating means for parahydrogen. The radiation is produced by transition between the second rotational energy level of the parahydrogen and the lower rotational energy level of the orthohydrogen.

---

The present invention relates to lasers and has as its object a laser capable of emitting an infrared radiation within the band of 40 microns, that is, within a band in which are unknown to the present suitable sources for producing the infrared radiation and of which the utility, nevertheless, is manifest, for example, in the domain of laboratory research or radio-astronomy.

The laser accordnig to the present invention belongs to the group of lasers with gas, and is characterized by the fact that it is a laser with three levels operating with the hydrogen, with utilization of the transition between the second rotational energy level of the parahydrogen and the lower rotational energy level of the orthohydrogen, the parahydrogen and the orthohydrogen being, as is well known, two allotropic forms of the hydrogen, differing from each other by the orientation, respectively, in opposite directions or in the same sense of the magnetic moments of two protons of the molecule thereof.

The laser according to the present invention is additionally cryogenic, that is, it comprises a circuit provided with compression means, cooling means, liquefaction means and evaporation means, in which one of the allotropic forms of the hydrogen is transformed into the other, characterized in that it comprises catalysis means to transform the orthohydrogen into parahydrogen to profit from the population of the second rotational energy level of this latter body.

According to a further development of the present invention, a heat-exchanger is disposed between the descending portion and the rising portion of the cooling circuit.

Accordingly, it is an object of the present invention to provide a laser capable of producing infrared radiation in the 40-micron band.

It is another object of the present invention to provide a laser emitting an infrared radiation which utilizes the transition between the second rotational energy level of parahydrogen and the lower rotational energy level of orthohydrogen to produce the desired coherent emission.

Another object of the present invention resides in a laser device of the type described above which is relatively simple and efficient as well as capable of producing substantial energy in the output thereof.

Figure 1:
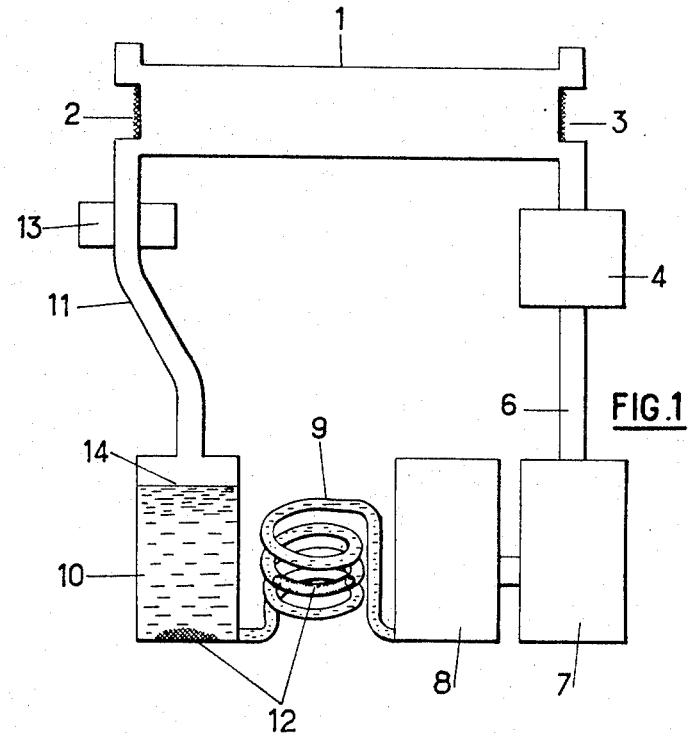
Figure 2:
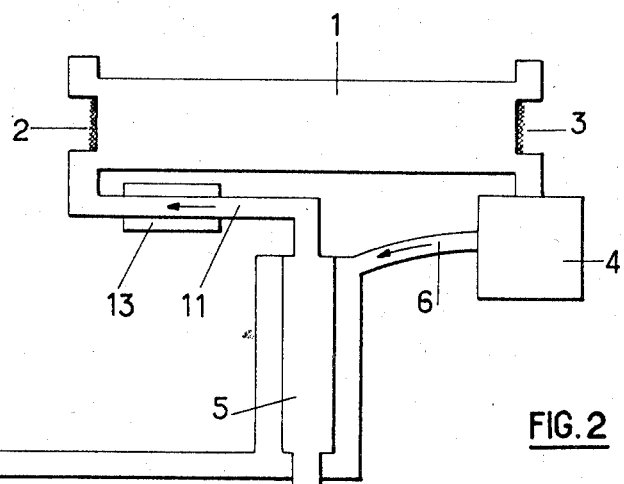

These and other objects, features, and advantages of the present invention will become more obvious from the following description when taken in connection with the accompanying drawing which shows, for purposes of illustration only, two embodiments in accordance with the present invention, and wherein:

FIGURE 1 is a schematic diagram of a laser installation in accordance with the present invention, and FIGURE 2 is a schematic diagram of a modified embodiment of a laser installation in accordance with the present invention in which a heat-exchanger in provided.

Referring now to the drawing wherein like reference numerals are used throughout the two views to designate like parts, and more particularly to FIGURE 1, reference numeral 1 designates therein a schematically shown enclosure with two mirrors 2, 3 at the extremities thereof forming a conventional resonator of the Perot-Fabry type. The interior of the enclosure 1 is connected to a circuit comprising a pump 4, a descending line section 6, a compressor 7, means 8 for liquefying hydrogen, a coil 9, a reservoir or tank 10, and a rising line section 11 surrounded by a reheating apparatus 13 and connected to the opposite side of the enclosure 1. According to the present invention, hydrogen is caused to circulate within the cooling circuit described above, and one places into a portion of the circuit, for example, as indicated at 12 along the walls of the coil 9 and at the bottom of the tank 10, a paramagnetic catalyst such as gadolinium or nickel oxide, known for its properties of catalyzing the transformation from orthohydrogen into parahydrogen.

Operation

The laser installation of FIGURE 1 operates as follows:

It is known that normal hydrogen is a mixture of about ¼ parahydrogen and ¾ orthohydrogen. At the temperature of liquefaction (approximately 257° C.) and under the action of the catalyst, the orthohydrogen transforms itself rather rapidly (3–4 minutes) into substantially pure parahydrogen, the only stable state at this temperature. This parahydrogen of which the liquid level is indicated at 14 in the tank 10 vaporizes within this tank 10 with a saturating vapor pressure which one will maintain, by the suitable choice of the quantities of material and dimensions of the reservoir 10, at a value of the order of 1 or several centimeters of mercury. The evaporated parahydrogen is heated to the surrounding temperature by the reheating device 13, such as a small warming apparatus, surrounding the rising line section 11. Strict precautions of insulation must be taken to avoid any conduction of heat toward the reservoir 10. It is essential that the rising section 11 and the enclosure 1 be covered on the inside with a dielectric, such as quartz, and that one eliminates with great care all the metallic parts and paramagnetic impurities: the absence of these precautions could produce the transition parahydrogen-orthohydrogen, outside the desired conditions.

In effect, if one favored involuntarily the transition parahydrogen-orthohydrogen, by a metallic or paramagnetic impurity, the spontaneous emission would be very intense, and the stimulated emission would be greatly lessened. The emitted radiation would then be incoherent.

If these conditions, in contrast, are observed, the molecules of parahydrogen which enter into the enclosure 1 are distributed between several statistical rotational levels proportional to $2L+1$, L being the characteristic figure of the level which can only be zero or even for parahydrogen. The two first levels correspond to $L=0$ and $L=2$.

The statistical calculation of the populations of these levels establishes that at the ordinary temperature about 50% of the molecules correspond to $L=2$ and 50% to $L=0$. At the same time, the level $L=1$, which corresponds to orthohydrogen, is unoccupied since only parahydrogen exists in the gas admitted into the cavity 1. Hence, the conditions of the laser effect by transition between the levels $L=2$ and $L=1$ exist after suitable stimulation. This stimulation is assured by the photons emitted during the starting period by the first transitions produced haphazardously in certain molecules. These photons are maintained within the cavity during a certain time by the effect of the mirrors thereof and effectuate a coherent stimulation of a much larger number of new molecules. The coherent emission of a radiation of about 41 microns wavelength results therefrom.

The orthohydrogen obtained after the transition is evacuated by the descending conduit section 6 and reintroduced into the cooling circuit.

It is obvious that in the descending line section 6, one may, in principle, introduce without inconvenience metallic parts since the transition has already taken place. Nevertheless, the pump 4 which will operate under relatively little severe conditions, with the downstream pressure being superior to the upstream pressure by some tens of torr, will advantageously have the blades on vanes and walls thereof covered with dielectric; thus, one will avoid an inopportune and premature release of the transition by an accidental turbulence between the descending section 6 and the enclosure 1. On the other hand, the compressor 7 and liquefier 8 may be strictly of usual structure and design.

It is to be noted that a cryogenic laser operating with hydrogen is already known; however, such prior art laser related to a laser with two levels and with utilization of the transition between $L=1$ and $L=0$, that is, with the transformation, within the cavity, of the orthohydrogen into parahydrogen, completely contrary to the present invention. The wavelength obtained by the prior art laser was then about 83 microns.

The schematic diagram of FIGURE 2, in which similar reference numerals are used as in FIGURE 1 to designate analogous parts, differs from FIGURE 1 only by the fact that a heat-exchanger 5 is disposed between the descending line section 6 and the rising line section 11. This arrangement permits to economize refrigerant medium within the liquefier means 8. Otherwise, the operation is similar to FIGURE 1.

While I have shown and described two embodiments in accordance with the present invention, it is understood that the same is not limited thereto but is susceptible of numerous changes and modifications as known to a person skilled in the art. For example, the system of the present invention may be combined with well-known devices varying the effective reflectivity of the mirrors 2 and 3 by means of the addition of a Kerr cell, devices which have been used in ruby lasers as disclosed in the communication by F. J. McClung and R. W. Hellwarth, 1961 Thanksgiving meeting at the University of Chicago, Nov. 24, 1961. The result of such addition would be for the device according to the present invention, as for ruby lasers, the pulsed operation thereof and the considerable increase of the instantaneous power. Furthermore, all these devices shown only schematically in the drawings may be of any conventional construction as known to a person skilled in the art.

Thus, while I have shown and described only two embodiments in accordance with the present invention, it is understood that the same is not limited thereto but is susceptible of numerous modifications and changes, and I therefore do not wish to be limited to the details shown and described herein but intend to cover all such changes and modifications as are encompassed by the scope of the appended claims.

I claim:

1. A laser device having a hydrogen-filled resonant cavity, the hydrogen being a mixture of parahydrogen and orthohydrogen, said device operating by transformation within said cavity of the parahydrogen into orthohydrogen while concurrently emitting electromagnetic radiation on a wavelength of substantially 40 microns, said cavity having end mirrors and including an input duct and an output duct for said hydrogen, and an external circulation circuit for the hydrogen connected between said input and output ducts, said circuit including pump means, compressing means, cooling means for effecting liquefaction of the hydrogen, tank means for the liquefied hydrogen, catalyzing means provided at least in the portion of the circuit between said cooling means and said tank means for transforming within said circuit the orthohydrogen content of said hydrogen into parahydrogen, and reheating means for reheating the parahydrogen to about ambient temperature within the portion of the circuit between said tank means and said input duct.

2. A laser device operable with hydrogen gas, with the hydrogen thereof being a mixture of parahydrogen and orthohydrogen, the molecules of said orthohydrogen having a rotational energy level intermediate two rotational energy levels of the molecules of said parahydrogen, comprising resonant cavity means including end reflectors and defining an enclosure for the hydrogen gas, means for producing rotational energy transition of said hydrogen molecules between the higher of said parahydrogen energy levels and said intermediate orthohydrogen level to emit an electromagnetic radiation on a wavelength of about 40 microns during the transformation of parahydrogen into orthohydrogen within said device, the rotational energy levels of the parahydrogen and orthohydrogen being proportional to the number $2L+1$, wherein $L$ is the characteristic figure of each level, and wherein the lower of the parahydrogen levels is characterized by the figure $L=0$, the orthohydrogen intermediate level being characterized by the figure $L=1$ and the higher of the parahydrogen levels being characterized by the figure $L=2$, conversion means for reconverting orthohydrogen extracted from said cavity means to the higher level parahydrogen and applying said higher level parahydrogen to said cavity means, said conversion means being coupled to said cavity to provide for a continuous flow of parahydrogen to and orthohydrogen from said cavity.

3. A laser device as defined in claim 1, further including a metal pipe coil connected between said cooling means and said tank means.

4. A laser device as defined in claim 3, wherein said catalyzing means is provided on the internal walls of said coil.

5. A laser device as defined in claim 4, wherein said catalyzing means is additionally provided on the internal walls of said tank means.

6. A laser device as defined in claim 5, wherein said catalyzing means is selected from the group consisting of nickel oxide and gadolinium.

7. A laser device as defined in claim 3, and further including a thermally insulating coating provided on the internal walls of the input duct and essentially consisting of a non-metallic material, the internal elements of said pump means and the walls of said cavity being coated with a dielectric material.

8. A laser device as defined in claim 3, wherein said catalyzing means is chosen from the group essentially consisting of nickel oxide and gadolinium, and further including heat exchange means connected between said input and output ducts.

9. A gas laser device as defined in claim 1, wherein said catalyzing means is chosen from the group essentially consisting of nickel oxide and gadolinium.

10. A laser device as defined in claim 1, wherein said catalyzing means is provided on the internal walls of said tank means.

11. A laser device as defined in claim 1, wherein a thermally insulating coating is provided on the internal walls of the input duct.

12. A laser device as defined in claim 11, wherein said thermally insulating coating provided on the internal walls of the input duct essentially consists of a non-metallic material.

13. A laser device according to claim 12, wherein said non-metallic material forming the coating is quartz.

14. A laser device as defined in claim 1, further including heat exchange means connected between said input and output ducts.

15. A laser device as defined in claim 1, wherein the internal elements of said pump means are coated with a dielectric material.

16. A laser device as defined in claim 15, wherein the walls of said cavity are also coated with a dielectric material.

17. A laser device as defined in claim 1, wherein the walls of said cavity are coated with a dielectric material.

References Cited

UNITED STATES PATENTS 3,255,423   6/1966   Ramsey et al. _____ 331—94

JEWELL H. PEDERSEN, *Primary Examiner.*

R. L. WIBERT, *Assistant Examiner.*